United States Patent
Dehn et al.

(10) Patent No.: US 6,736,584 B2
(45) Date of Patent: May 18, 2004

(54) PAPER TRANSPORTATION TROLLEY

(75) Inventors: Soenke Dehn, Scharnhagen (DE); Ingo Neuber, Tuettendorf (DE)

(73) Assignee: Nexpress Solutions LLC, Rochester, NY (US)

( * ) Notice: Subject to any disclaimer, the term of this patent is extended or adjusted under 35 U.S.C. 154(b) by 0 days.

(21) Appl. No.: 10/274,556

(22) Filed: Oct. 21, 2002

(65) Prior Publication Data

US 2003/0091414 A1 May 15, 2003

(30) Foreign Application Priority Data

Nov. 9, 2001 (DE) .......................... 101 54 743

(51) Int. Cl.[7] .............................................. B65G 67/00
(52) U.S. Cl. ...................... 414/396; 414/401; 271/157; 399/110
(58) Field of Search ................................ 414/396, 401, 414/467; 271/157, 158; 312/111

(56) References Cited

U.S. PATENT DOCUMENTS

| | | | |
|---|---|---|---|
| 3,739,924 A | 6/1973 | Stobb | 214/6 H |
| 3,825,134 A | 7/1974 | Stobb | 214/152 |
| 4,703,924 A | 11/1987 | Marass | |
| 5,074,207 A | 12/1991 | Lübke et al. | |
| 5,144,369 A * | 9/1992 | Benedict et al. | 399/119 |
| 5,322,496 A * | 6/1994 | Ernst et al. | 493/410 |
| 5,562,385 A * | 10/1996 | Tacchi et al. | 414/391 |
| 5,647,720 A * | 7/1997 | Golicz et al. | 414/490 |
| 5,740,930 A | 4/1998 | Smit | 213/75 R |
| 5,813,670 A | 9/1998 | Maass | 271/157 |
| 6,071,069 A * | 6/2000 | Wyssmuller et al. | 414/807 |
| 6,089,812 A * | 7/2000 | Junker | 414/401 |
| 6,090,031 A * | 7/2000 | Golicz et al. | 493/416 |
| 6,192,295 B1 * | 2/2001 | Gunther | 700/225 |
| 6,312,208 B1 * | 11/2001 | Crowley et al. | 414/398 |

FOREIGN PATENT DOCUMENTS

| | | | |
|---|---|---|---|
| CH | 546194 | 6/1972 | |
| DE | 871 158 | 3/1953 | .................... 15/10 |
| DE | 4126542 | 8/1991 | |
| DE | 69610047 | 6/1996 | |
| EP | 0 755 812 B1 | 6/1996 | ............ B60D/1/46 |

* cited by examiner

Primary Examiner—Khoi H. Tran

(57) ABSTRACT

A paper transportation trolley with first guide members on the paper transportation trolley and second guide members on a coupling device of the printing machine for locking the paper transportation trolley to, and releasing it from the printing machine. The paper transportation trolley is movable over the coupling device, the first guide members sliding over the second guide members and the paper transportation trolley is connected to the coupling device by a retainer device.

6 Claims, 5 Drawing Sheets

PAPER TRANSPORTATION TROLLEY

FIELD OF THE INVENTION

The invention relates in general to a paper transportation trolley.

BACKGROUND OF THE INVENTION

Printing machines are loaded with printing material by a paper feeder, and the printed material is removed from the printing machine by a delivery device. Because of a substantial amount of printing material, special paper transportation trolleys are used for transporting the printing material. Such paper transportation trolleys are mobile, and they supply the printing material to the printing machine or deliver it from the printing machine. The paper transportation trolley is brought to the printing machine, and the printing material is received on a pallet of the printing machine or removed therefrom. There is a danger that the printing material may not be placed or stay registered and straight on the pallet.

SUMMARY OF THE INVENTION

It is an object of the invention to provide a paper transportation trolley which can reliably transport printing material and put it on, or remove it from a printing machine.

To facilitate undocking or release of a retainer device and the paper transportation trolley from the printing machine, a coupling device is provided with a release mechanism. For monitoring accurate coupling of the paper transportation trolley with the coupling device, a switch is provided in the retainer device, the first switching position of the switch corresponding to the released position of the paper transportation trolley and the second switching position of the switch corresponding to the locked position of the paper transportation trolley. In a preferred embodiment of the invention, conical locator pins are provided on the paper transportation trolley frame for engaging with the paper lift table for aligning pallet transfer between the paper transportation trolley and the paper lift table. These features allow for reliable transfer of the pallets on which the printing material is located from the paper transportation trolley to the paper lift table and vice versa. The paper transportation trolley is coupled to the coupling device with substantially low effort by means of guide rollers on first guide members of the paper transportation trolley for guiding second guide members of the coupling device over the first guide member. In a preferred manner, the printing machine has the second guide members, the retainer device, and a first stop, which are movable, and the paper transportation trolley has the first guide members, the guide rollers, and a second stop, as well as a lock pin for engaging the retainer device, which are movable.

It is preferred that the paper transportation trolley according to the invention and the respective devices of the printing machine be fitted to each other, and, more specifically, it is preferred that they be standardized in such a manner that the paper transportation trolley be compatible and interchangeable with different printing machines. The mating elements can be made individually adjustable.

The invention, and its objects and advantages, will become more apparent in the detailed description of the preferred embodiment presented below.

BRIEF DESCRIPTION OF THE DRAWINGS

In the detailed description of the preferred embodiment of the invention presented below, reference is made to the accompanying drawings, in which.

DETAILED DESCRIPTION OF THE INVENTION

Figure 1:
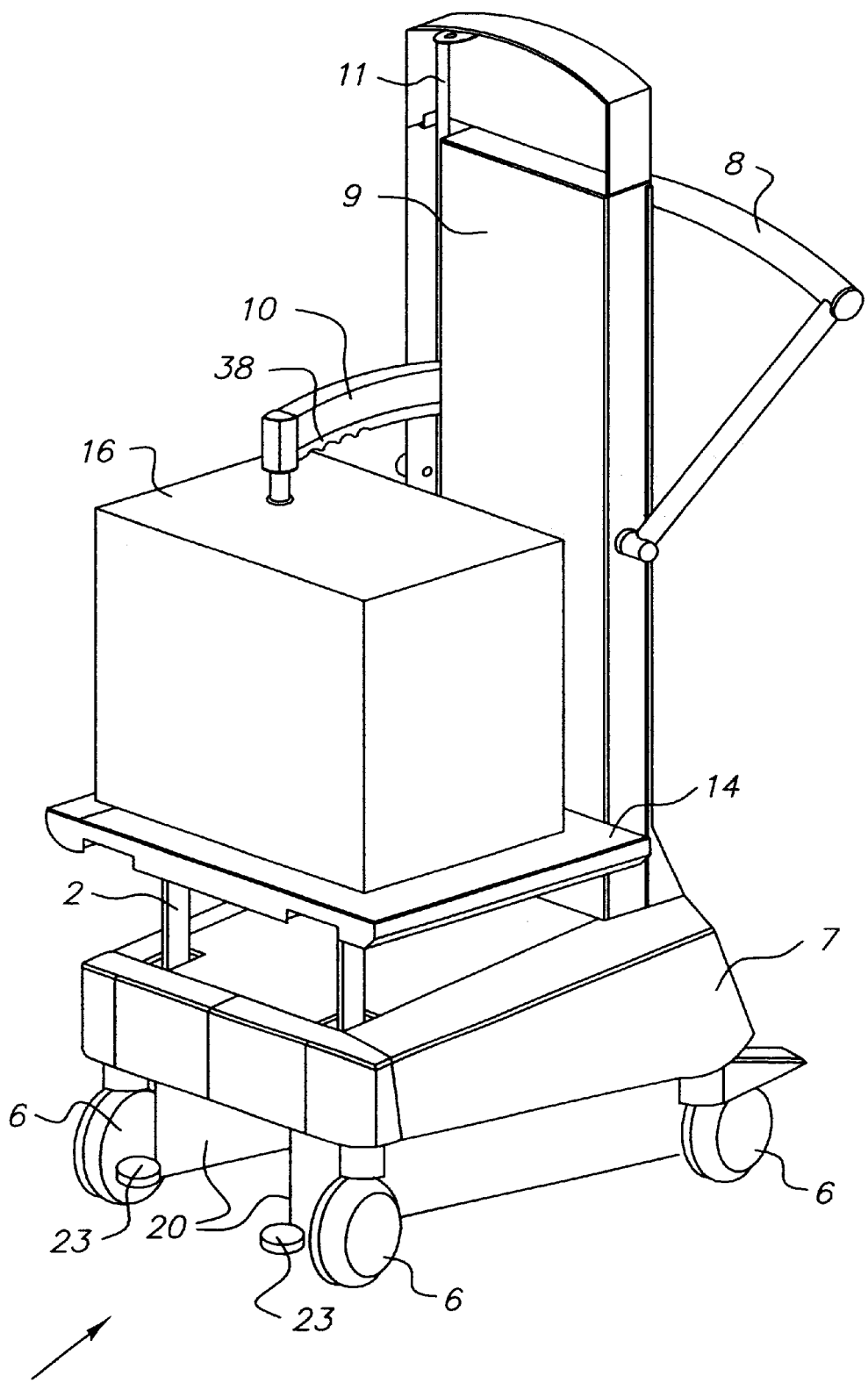
FIG. 1 is a perspective view of a paper transportation trolley in an embodiment of the invention.

Referring now to accompanying drawings:

FIG. 1 shows a perspective view of a paper transportation trolley 1 in an embodiment of the invention. The paper transportation trolley has a mobile body 7 having castors 6 on its bottom side. The castors 6 allow for moving the trolley, and they are installed for swiveling. First guide members 20, extending lengthwise of the paper transportation trolley 1, are provided on the inner side of the body 7. FIG. 1 shows two guide members 20, which are provided on the inner sides of the paper transportation trolley 1, opposite to each other. On the front end of the paper transportation trolley 1, a roller 23 is provided at each of the guide members 20 to extend in parallel with the floor. A rear wall 9 of the paper transportation trolley extends perpendicularly to the body 7 and is attached thereto. A guide tube 11 extends in the rear wall 9 substantially over the entire length thereof and in parallel therewith, and a stack clamp 10 for holding down a stack of printing material or a paper stack 16 is guided over this tube. Different heights of the paper stack 16 can be adjusted by adjusting the position of the stack clamp 10 to the height of the paper stack 16 by moving it from top onto the top surface of the paper stack 16, thereby applying a force to the paper stack 16. The stack clamp 10 is moved manually, and it transmits its clamping force to the paper stack 16 by pulling the handle 38 of the stack clamp 10 to release the stack clamp 10 from engagement with the guide tube 11. A thrust arm 8 is attached to the rear wall 9 and has a handle to be used by an operator to move the paper transportation trolley. A frame 2 is provided above the body 7 to run substantially in parallel with the support surface of the paper transportation trolley, and a pallet 14, which is made of a flat sheet and on which the paper stack 16 is located, being mounted on the frame. The frame 2 with the pallet 14 is movable perpendicularly with respect to the rear wall 9 so that the pallet 14 can be put on, or removed from the printing machine.

Figure 2:
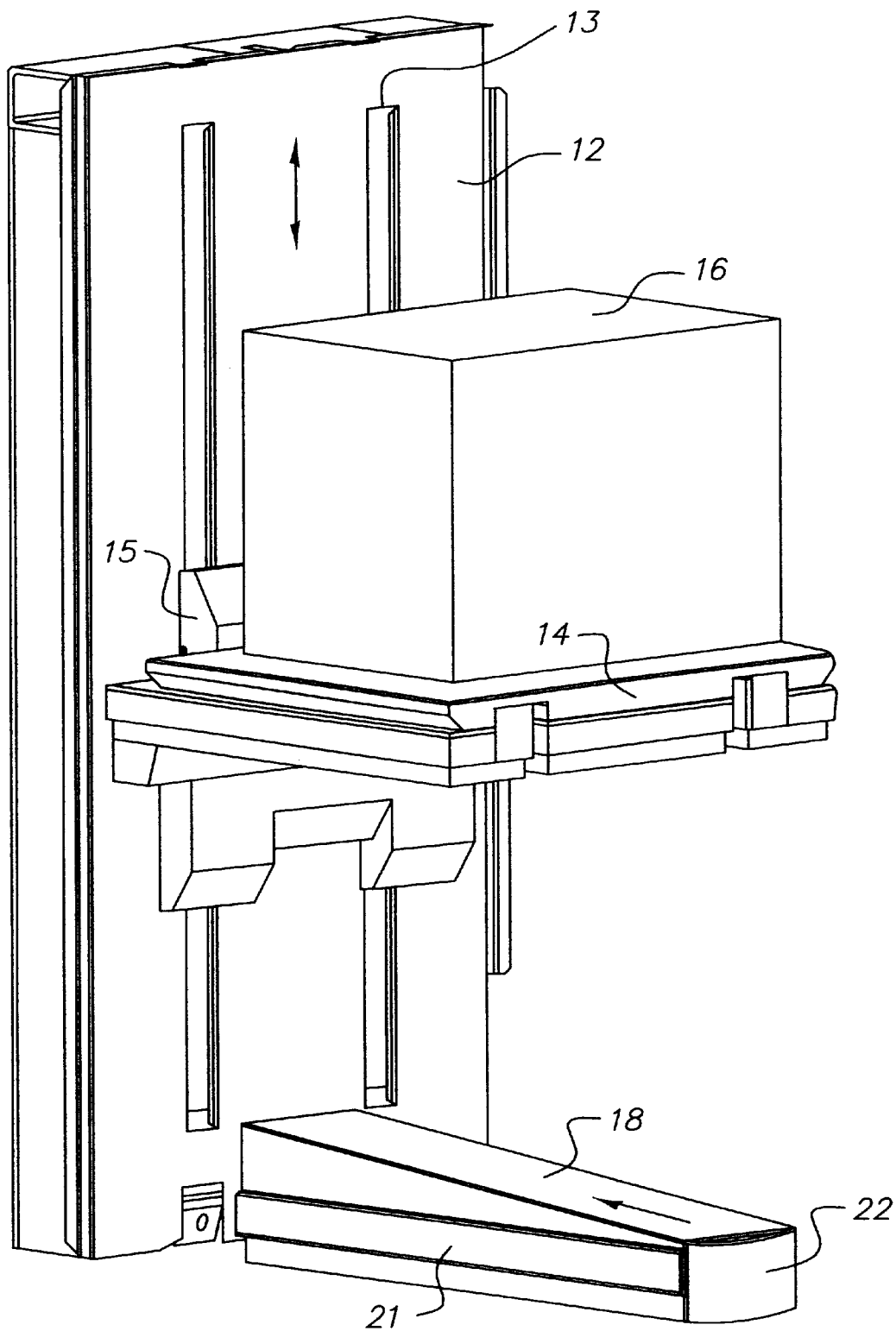
FIG. 2 is a perspective view of a paper lift table with a coupling device at a paper feeder for a printing machine.

FIG. 2 is a perspective view of a part of the paper feeder of a printing machine, having a wall 12. A coupling device 18 is attached to the bottom end of the wall 12 and extends transversally thereto. Second guide members 21 are provided on the side surfaces of the coupling device 18. The second guide members 21 correspond to the first guide members 20 and are matched to them in such a manner that when the paper transportation trolley 1 is coupled to the coupling device 18, the first guide members 20 slide over the second guide members 21, and the paper transportation trolley 1 comes to rest with its retainer device 35 (see FIGS. 4 and 5) in the end position at the first stop of the coupling device 18 and the second stop of the paper transportation trolley 1. The guide rollers 23 are supported by, and roll over the second guide members 21, facilitating the movement of the first guide members 20 and the second guide members 21 with respect to each other. In doing this, the paper transportation trolley 1 moves over the coupling device 18 in the direction shown by arrow in FIG. 2 toward the wall 12. The coupling device 18 is thus positioned in the space between the first guide members 20 indicated by arrow in FIG. 1. Guide grooves 13 are made in the wall 12 lengthwise thereof, in which is mounted a paper lift table 15 receiving the pallet 14 supporting the paper stack 16. The paper lift table 15, extending at right angles to the wall 12, is movable along the wall in the guide grooves. The printing material is taken to the printing machine from the paper lift table 15, from which the pallet 14 is transferred to the frame 2 of the paper transportation trolley 1.

Figure 3:
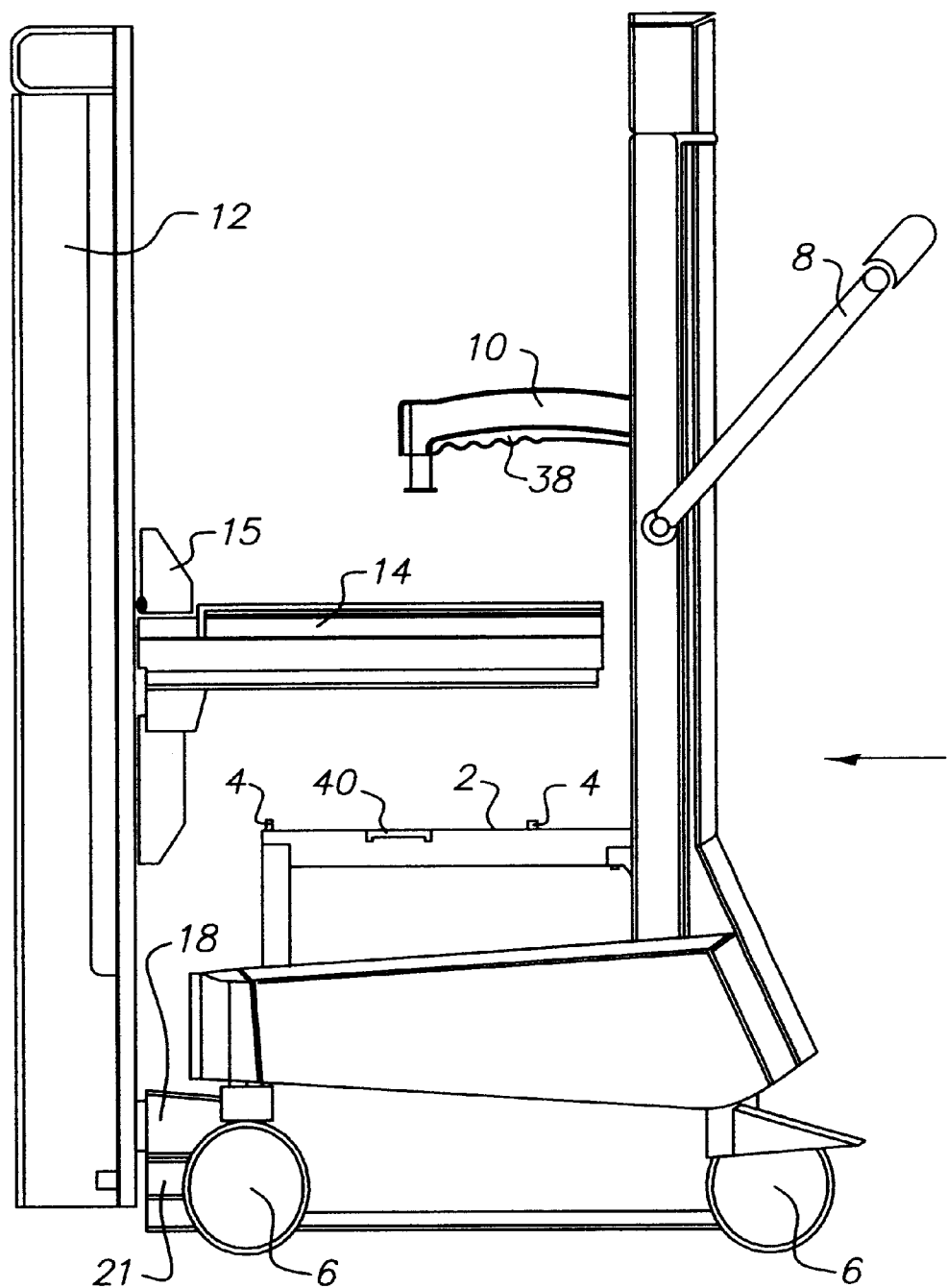
FIG. 3 is a side elevation view of the paper transportation trolley of FIG. 1 at the paper lift table of FIG. 2 with a pallet.

FIG. 3 shows the paper transportation trolley 1 of FIG. 1 and the wall 12 with the paper lift table 15 and pallet 14 of FIG. 2 in the side elevation view. It can be seen in this view in FIG. 3 that the frame 2 of the paper transportation trolley 1 does not have any pallet 14, and the pallet 14 is rather on the paper lift table 15. The first guide members 20 on the inner sides of the paper transportation trolley 1 have moved with respect to the second guide members 21 of the coupling device 18 to the printing machine, and the paper transportation trolley 1 is locked to the printing machine as discussed below. Locator pins 4, which are located on the frame 2 of the paper transportation trolley, are made in such a manner as to engage in a mating recess in the underside of the pallet 14. In this manner, an accurate connection is ensured between the pallet 14 and the support surface 2, which assures an accurate reception of the pallet 14. In addition, the pallet 14 rests on magnets 40 built in the support surface 2, which keep the pallet and prevent it from jumping off the locator pins 4 when the paper transportation trolley 1 moves faster along a curve.

Figure 4:
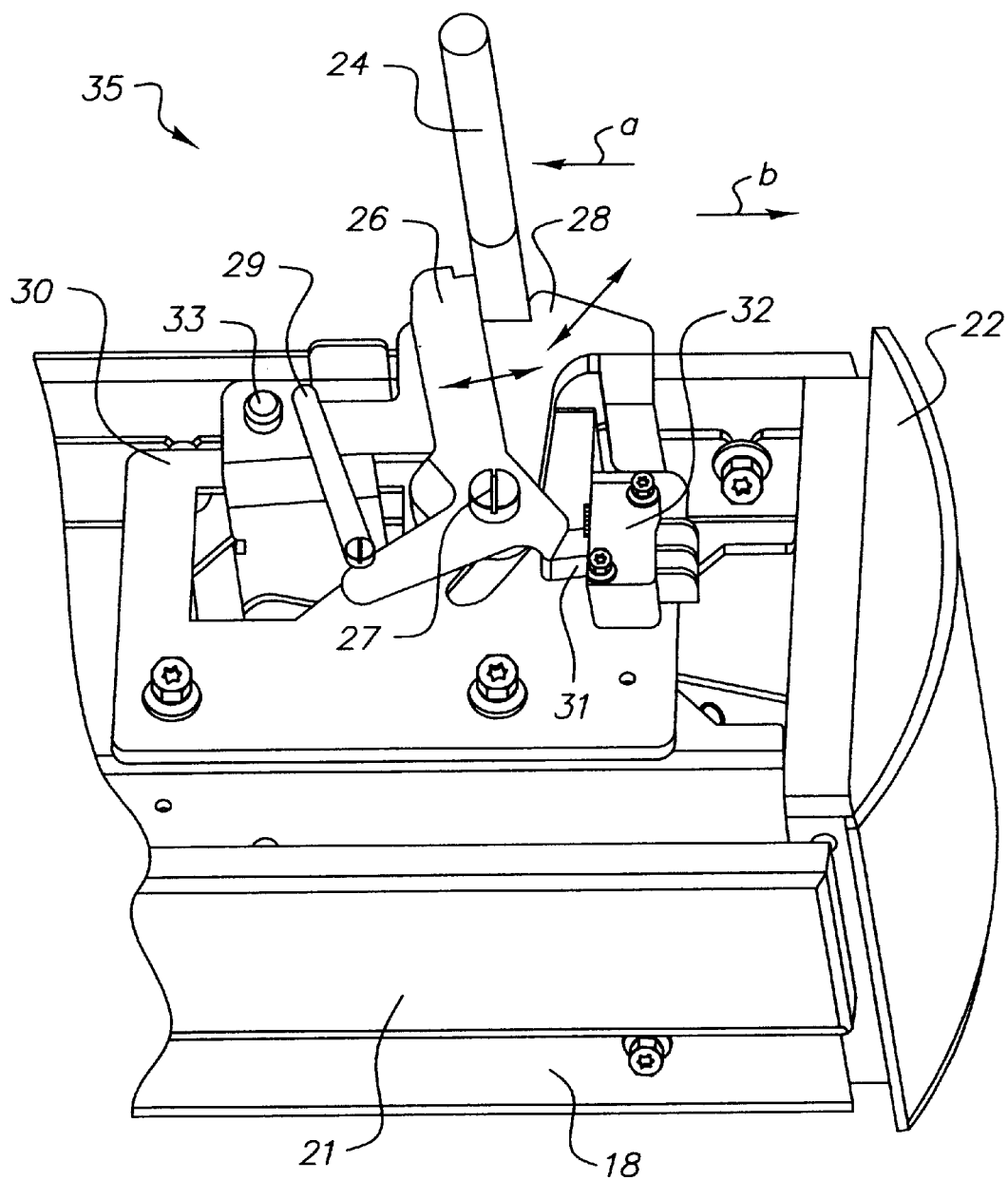
FIG. 4 is a perspective view of a retainer device with an open coupling device for locking the paper transportation trolley to the printing machine.

FIG. 4 shows an open view of the end of the coupling device 18 with the retainer device 35 for locking the paper transportation trolley 1 to, and releasing it from the coupling device 18 of the printing machine. The retainer device 35 has substantially a base plate 30, a bracket 28 with a pivot pin 33, a lock arm 26 with a pivot pin 27 and a spring 29, a release mechanism 22, and a switch 32. The bracket 28 with the pivot pin 33, the lock arm 26 with the pivot pin 27 and the spring 29, the release mechanism 22, and the switch 32 are located substantially on the base plate 30, which is attached to the coupling device 18. The lock arm 26 and the bracket 28 have portions protruding beyond the sides of the coupling device 18. A lock pin 24 is attached to the paper transportation trolley 1, which is engaged by the protruding portions of the bracket 28 and the lock arm 28. The retainer device 35 is shown in the locked position in FIG. 4. When the paper transportation trolley 1 is moved onto the coupling device 18 in the direction shown by arrow "a", the lock pin 24 of the paper transportation trolley 1 comes closer to the bracket 28 and engages the beveled outer side of the bracket 28. Additionally, the lock pin 24 engages the lock arm 26. When the paper transportation trolley 1 moves farther in the same direction, the lock arm 26 turns on its pivot pin 27 and moves in the direction of movement of the lock pin 24 and paper transportation trolley 1. Subsequently, the lock pin 24 presses the bracket 28 inwardly of the coupling device 18 because of the beveled surface on the bracket. When the lock pin 24 has moved to the end of the beveled surface of the bracket 28, the bracket 28 snaps to the outside in the direction away from the coupling device 18. Now the tip of the bracket 28 at the end of the beveled surface touches the lock pin 24. The lock pin 24 is now locked in the direction indicated by arrow "b" as shown in FIG. 4. The lock arm 26 is pressed against the lock pin 24 by the spring 29, which connects the lock arm 26 to the coupling device 18, and the farther the paper transportation trolley 1 has moved in the direction of arrow "a", the harder the pressure until the lock pin is locked as described here. In the position shown in FIG. 4, the portion 31 of the lock arm 26 touches the switch 32 as soon as the lock arm 26 arrives at the position shown in FIG. 4. The switch 32 has a contact at a point corresponding to the portion 31. The switch 32 thus changes its switching position. The information on the now achieved switching position of the switch 32 is sent to the control module of the printing machine. The printing machine operator will then obtain information on whether the paper transportation trolley is or is not locked on the coupling device 18.

To release the connection between the retainer device 35 and the paper transportation trolley 1, the operator activates the release mechanism 22, which is substantially made as a cam face and a pushrod. The release mechanism 22 is mounted on the coupling device 18. To activate the release mechanism, the operator moves the curved piece at the remote end of the coupling device 18 by the foot in the direction toward the printing machine as shown by arrow "a." It takes only a light tap on release mechanism 22. A push rod 23, extending at right angles to the release mechanism 22, is in a force transmitting connection with the release mechanism and acts upon a first end of the tension spring 25 on the bracket 28 as shown in FIG. 5.

Figure 5:
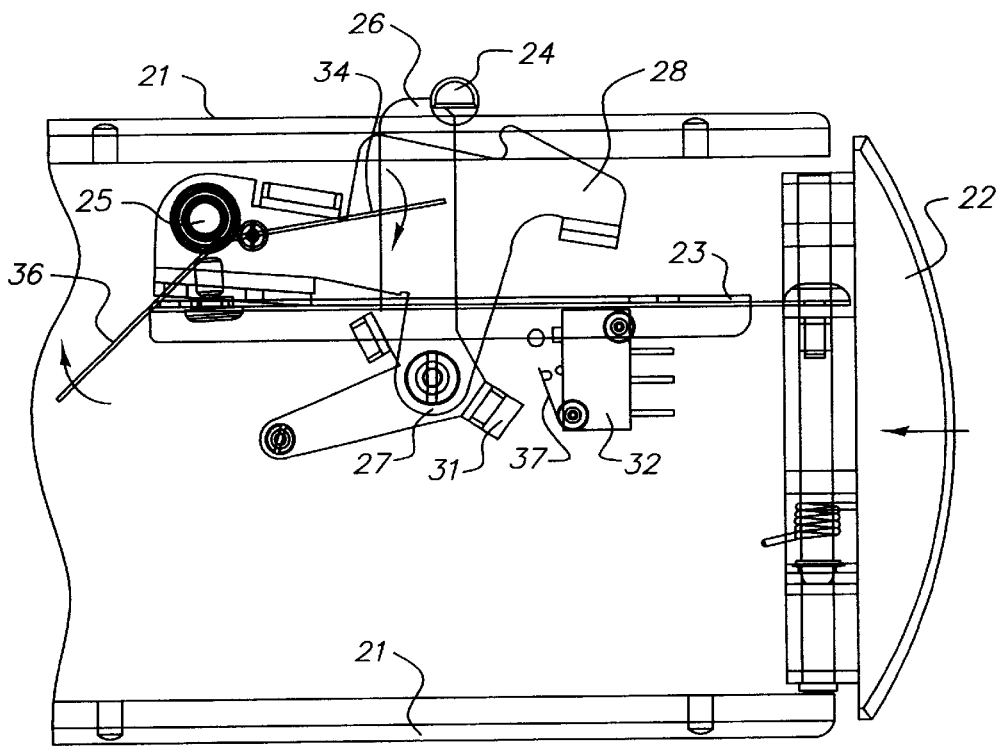
FIG. 5 is a transparent top view of the retainer device of FIG. 4.

FIG. 5 shows a transparent top view of a part of the coupling device 18 with the retainer device 35. When the first end 36 of the tension spring 25 is moved by the pushrod 23, the second end 34 of the tension spring moves and causes the bracket 28 to turn about its pivot point 27, moving the bracket 28 away from the lock pin 24. Since the lock arm 26 is pressed against the lock pin 24 by the spring 29, the lock arm 26 applies a force to the lock pin in the direction indicated by arrow "b", and, as a result, the lock pin 24 is caused to move in this direction along the beveled surface of the bracket 28 when the bracket 28 moves away. The portion 31 of the lock arm 26, which touches the switch 32 in the locked position of the retainer device 35, moves away from a contact 37 of the switch 32, which now transfers to the second switching state shown in FIG. 5 as the open contact 37. In FIG. 5, the lock arm 26 has moved to the right with respect to what is shown in FIG. 4, and the portion 31 of the lock arm 26 has moved away from the contact 37 of the switch 32. The information on this second switching position is sent from the switch 32 to the control module of the printing machine. In this position, in which the bracket 28 has moved away from the lock pin 24, which is the released position, the paper transportation trolley 1 can be moved away from the coupling device 18 of the printing machine. To do this, the thrust arm 8 of the paper transportation trolley 1 should be pulled away from the printing machine, the first guide members 20 with the guide rollers 23 will slide outwardly in the direction shown by arrow "b" in FIG. 4 over the second guide members 21 of the paper transportation trolley 1, and the coupling device 18 will separate from the paper transportation trolley 1.

The invention has been described in detail with particular reference to certain preferred embodiments thereof, but it will be understood that variations and modifications can be effected within the spirit and scope of the invention.

What is claimed is:

1. A paper transportation trolley (1) for supplying printing material (16) on a pallet (14) to, or removing said pallet from a printing machine, comprising: first guide members (20) on the paper transportation trolley (1) and second guide members (21) on a coupling device (18) of the printing machine, which cooperate therewith, said coupling device having a retainer device (35) for locking the paper transportation trolley (1) to, and releasing it from, the printing machine.

2. The paper transportation trolley (1) of claim 1, wherein said coupling device includes a release mechanism (22) for releasing said retainer device (35) and the paper transportation trolley (1) from the printing machine.

3. The paper transportation trolley (1) of claim 1 wherein said retainer device includes a switch (32), the first switching position of said switch indicating the released state of the paper transportation trolley (1) and the second switching position of said switch indicating the locked position of the paper transportation trolley with respect to the printing machine.

4. The paper transportation trolley (1) of claim 2, further including a paper lift table (15) of the printing machine, and conical locator pins (4) of a frame (2) of the paper transportation trolley (1) for engaging said paper lift table (15) to align the transfer of a pallet (14) between the paper transportation trolley (1) and said paper lift table (15).

5. The paper transportation trolley (1) of claim 2, wherein said first guide members (20) of the paper transportation trolley (1) include guide rollers (23) for guiding said second guide members (21) of the coupling device (18) over said first guide members (20).

6. The paper transportation trolley (1) of claim 5, wherein said second guide members (21), said retainer device (35), and a first stop on the printing machine are movable, and said first guide members (20), said guide rollers (23), and a second stop, as well as a stop pin (24) for engaging said retainer device (35) on the paper transportation trolley (1), are movable.

* * * * *